United States Patent [19]

Roberts et al.

[11] Patent Number: 4,843,383
[45] Date of Patent: Jun. 27, 1989

[54] TRANSISTOR MATRIX SHIFTER

[75] Inventors: Scott Roberts, Puyallup; Steven Tibbitts, Spanaway; Warren Snyder, Puyallup, all of Wash.

[73] Assignee: National Semiconductor Corporation, Santa Clara, Calif.

[21] Appl. No.: 143,774

[22] Filed: Jan. 13, 1988

[51] Int. Cl.[4] .............................................. H04Q 1/00
[52] U.S. Cl. .............................. 340/825.9; 340/825.79; 340/825.83
[58] Field of Search ....................... 307/465, 466, 472; 364/712, 748; 340/825.32, 825.9, 825.79, 825.8, 825.83

[56] References Cited

U.S. PATENT DOCUMENTS

| | | | |
|---|---|---|---|
| 4,009,468 | 2/1979 | Calcagno et al. | 340/825.79 X |
| 4,124,899 | 11/1978 | Birkner et al. | 307/465 |
| 4,607,176 | 8/1986 | Burrows et al. | 307/465 X |
| 4,757,470 | 7/1988 | Bruce et al. | 340/723 X |
| 4,771,281 | 9/1988 | Fox et al. | 340/825.83 X |
| 4,773,033 | 9/1988 | Ikumi | 364/748 X |

Primary Examiner—Ulysses Weldon
Attorney, Agent, or Firm—Lee Patch; Elmer W. Galbi; Robert C. Colwell

[57] ABSTRACT

An expandable ECL matrix shifter is provided to have very few interconnecting wires. The shifter can perform a multicolumn right shift or a multicolumn left shift in one cycle, and it has independent wrap and fill capabilities. Two 2 to 1 multiplexers are provided for each bit position of the input signals. The input signals provide one of the inputs for both of the multiplexers. The second input of each multiplexer is a signal indicating what type of fill is desired. The shifter has horizontal data input lines, vertical data output lines, and diagonal select lines. A bipolar transistor is located at each intersection of a data input line and a data output line. These transistors selectively connect the data input lines to the data output lines in response to signals on the diagonal select lines. Each horizontal data input line is divided into two parts. The division of the data input lines into parts is along a major diagonal of the matrix. The parts of the data input lines on one side of the major diagonal are activated by the output of one of the multiplexers, and the parts of the data input lines on the other side of the major diagonal are activated by the outputs of the second multiplexer.

7 Claims, 2 Drawing Sheets

TRANSISTOR MATRIX SHIFTER

FIELD OF THE INVENTION

The present invention relates to electronic circuitry and more particularly to a bipolar integrated circuit shift matrix.

BACKGROUND AND PRIOR ART

In modern digital computers, data is generally arranged in bytes, each of which has a number of bits. There are many situations where it is desirable to shift the bits in a byte to the right or to the left. For example, binary numbers may be stored in eight bit bytes. A binary number may be effectively multiplied by two by shifting the bits one position to the left. Thus, the binary number 00000100 can be multipied by two by shifting the bits one position to the left, thereby producing the binary number 00001000.

Data shifters can be divided into two classes, namely, clocked shift registers and matrix shifters. In clocked shift registers, data can be shifted one position in each clock cycle. Clocked shift registers are standard commercially available components.

Matrix shifters are also well known and commercially available. Matrix shifters are generally employed to shift data several bit positions in one clock cycle. In matrix shifters, there are data input lines, data output lines, and a plurality of shift control lines. The signals on the shift control lines indicate the number of positions that the data is to be shifted. For example, there may be three shift lines that have signals representing a binary number from zero to seven. Depending upon the value of the signals on the shift control lines, the data on the data input lines is shifted from zero to seven positions as it moves from the data input lines to the data output lines.

In some applications the data bits which overflow out of the high end of the shifter must be re-introduced into the low end of the shifter. Shifters which perform this function are generally known as barrel shifters, and the operation of introducing bits which overflow from one end on the shifter into the other end of the shifter is generally termed a "wrap" function. Barrel shifters can be implemented in the form of clocked shift registers or in the form of matrix shifters.

Many prior art matrix shifters, and in particular matrix shifters which use ECL technology, have been implemented by connecting together a plurality of multiplexers. Such matrix shifters require a substantial amount of wiring to interconnect the multiplexers into a matrix shifter.

Representative prior art matrix shifters which are formed by connecting together a plurality of multiplexers are shown in FIGS. 1A, 1B and 1C. FIG. 1A shows a prior art eight bit barrel shifter which includes three banks of 2 to 1 multiplexers A1, A2 and A3. Each bank of the multiplexers A1, A2 and A3 has eight positions, which receive two inputs and produce one output. Three select lines designated A-S0, A-S1, and A-S2 control the three banks of multiplexers and determine which input signals are gated to the output line at each bit position. Data bits on eight inputs D0 to D7 pass through the shifter to eight output lines F0 to F7. The position that the input bits D0 to D7 appear on the outputs F0 to F7 is determined by the signals on lines A-S0, A-S1 and A-S2.

Another prior art eight bit barrel matrix shifter implemented sing banks of multiplexers is shown in FIG. 1B. The circuit shown in FIG. 1B has one bank of 2 to 1 multiplexers B1 and one bank of 4 to 1 multiplexers B2. Three control lines B-S0, B-S1 and B-S2 determine how much shift takes place. Multiplexer bank B1 works identically to multiplexer A1 shown in FIG. 1A. Multiplexer bank B2 has 4 to 1 multiplexers wherein each bit position of the multiplexer has four inputs and one output. The particular input that is gated to the output is determined by the two control lines B-S1 and B-S2.

Yet another prior art matrix shifter which uses a bank of multiplexers is shown in FIG. 1C. The matrix shifter in FIG. 1C has only one bank of 8 to 1 multiplexers C1 which has eight positions. Each bit position in the multiplexer bank C1 receives eight inputs and produces one output. Which particular input is gated to the output is determined by control lines C-S0, C-S1 and C-S2.

As can be seen from FIG. 1A, 1B and 1C, the prior art ECL shifters have a substantial amount of wiring which directs the input bits to various bit positions in the multiplexers. Furthermore, additional logic (not shown in FIGS. 1A, 1B or 1C) is necessary to provide the appropriate fill bits for the bit positions at the side of the shifter from which data is shifted. For example, if data is shifted to the right, fill bits must be provided at the left side of the shifter, when the shifter is not used as a barrel shifter.

SUMMARY OF THE INVENTION

The present invention provides a low cost, compact matrix shifter which has a relatively small number of interconnections and which has a high performance to power ratio. The present invention also provides a matrix shifter which can easily be implemented in ECL technology.

A matrix shifter built in accordance with the present invention is expandable, it can perform a right shift or a left shift, it has independent wrap and fill capabilities, and it can perform "flash" shifting whereby data can be shifted several positions in a single operation.

With the present invention, two banks of 2 to 1 multiplexers are provided for each bit position of the data input signal. The data input signals provide one of the inputs for both banks of the multiplexers. The second input of each bank multiplexer is a signal indicating whether the fill bits should be "0" or "1" bits.

The shifter has horizontal data input lines, vertical data output lines, and diagonal select lines. A transistor switch is located at each intersection of a data input line and a data output line. These transistors selectively connect the data input lines to the data output lines in response to signals on the diagonal select lines.

Each horizontal data input line is divided into two parts. The division of the data input lines into parts is along a major diagonal of the matrix. The parts of the data input lines on one side of the major diagonal are activated by the output of one of the multiplexers, and the parts of the data input lines on the other side of the major diagonal are activated by the outputs of the second multiplexer.

In a situation where one multiplexer selects fill and the second multiplexer selects data, there is a right or left shift depending upon which multiplexer selects data and which selects fill. If both multiplexers select data, the matrix provides a wrap function.

DETAILED DESCRIPTION

Figure 1A:
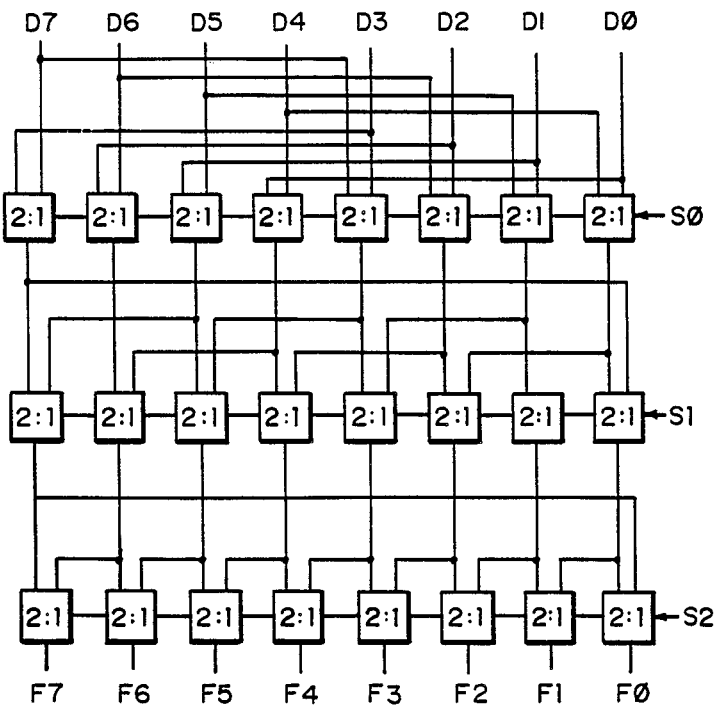
FIGS. 1A, 1B, and 1C are logical block diagrams of the prior art matrix shift register.
Figure 1B:
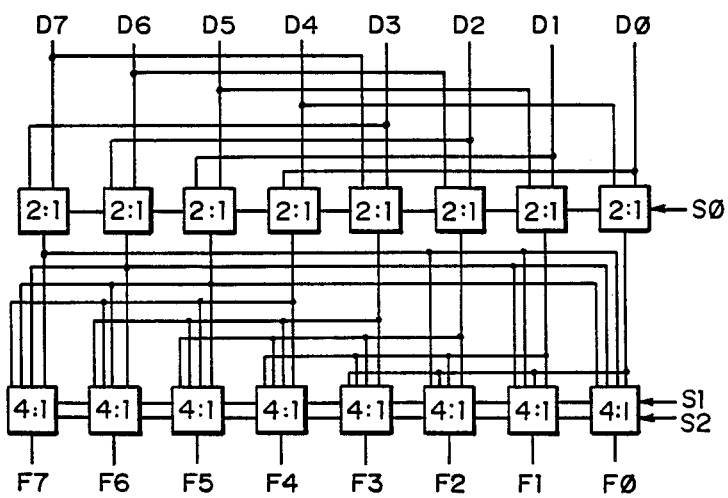
Figure 1C:
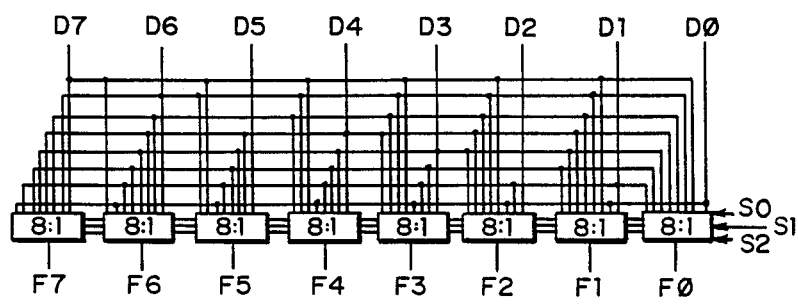
Figure 2:
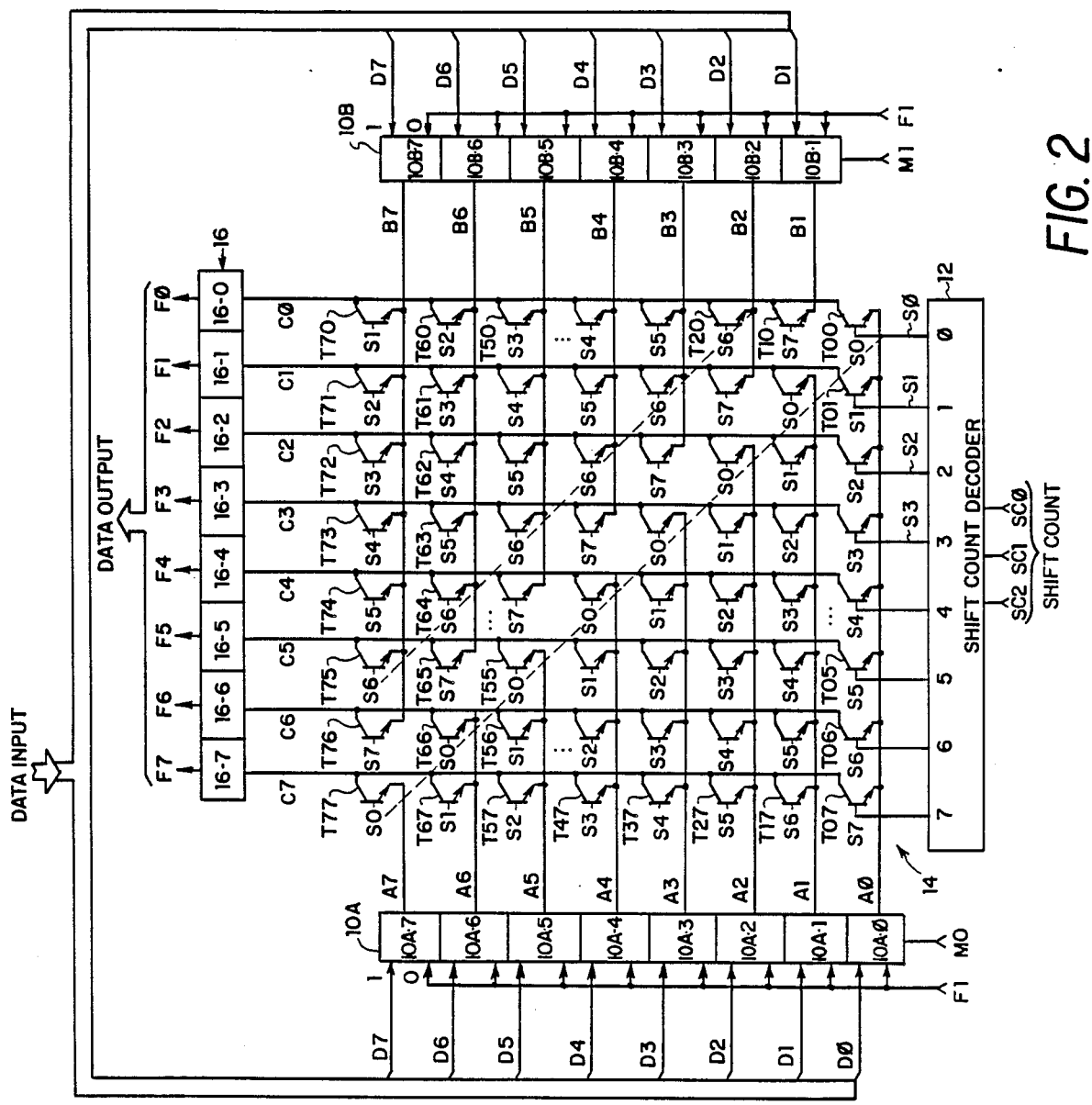
FIG. 2 is a diagram of an embodiment of the present invention.

An embodiment of the invention designed to shift an eight bit data word is shown in FIG. 2. The invention is applicable to data words of any length, and an embodiment showing a relatively short eight bit data word has been chosen in order to simplify the explanation of the invention. The manner in which the invention can be applied to data words of any size will be explained later.

The bit positions in the data input signals are designated D0 to D7, and the bit positions in the data output signals are designated F0 to F7. An input line designated F1 indicates if a "1" or a "0" fill bit is desired. Three shift select lines SC0, SC1 and SC2, indicate the amount of shift desired. Finally, two mode control lines M0 and M1 indicate if a right shift, a left shift, or a barrel shift is desired.

The embodiment shown in FIG. 2 includes two banks of multiplexers 10A and 10B, a shift count decoder 12, a transistor matrix 14, and output sense amplifiers 16. Each of the banks of multiplexers 10A and 10B has one position 10A-0, 10A-1, 10A-2, etc., and 10B-1, 10B-2, etc., for each input data bit D0 to D7 except there is no multiplexer or bank 10B-0 for bit D0. Each position of each bank of multiplexers has two inputs, one of which is a data bit, and one of which is a fill bit. Each bank of multiplexers either gates the data bits or the fill bits to the matrix 14 depending upon the signals on control lines M0 and M1. For example, if line M0 is active, data bits D0 to D7 are gated to lines A0 to A7. If line M0 is not active, fill bits are gated from line F1 to lines A0 to A7. Thus, control lines M0 and M1 determine if data or fill is gated to lines A0 to A7 and B1 to B7.

Matrix 14 has eight columns and eight rows. Transistors T00 to T77 which can be bipolar ECL transistors are located at the intersection of the rows and columns. For ease of reference, the transistors are designated with a three digit designation, the first digit is "T", the second digit is a number 0 to 7 indicating the row in the matrix, and the third digit is a number 0 to 7 which indicates the column. Thus, transistor T71 is associated with the seventh row and column one.

The transistors T00 to T77 are controlled by the select signals S0 to S7 which are generated by shift count decoder 12. In order to avoid confusion in the drawing, the circuit lines connected to the base of all of the transistors T00 to T77 are not shown; however, the drawing has a line designation S0 to S7 next to the base of each transistor which shows that control line is connected to the base of each transistor. For example, line S0 is connected to transistors T00, T11, T22, T33, etc., and line S1 is connected to transistors T01, T12, T23, T34, ... T67 and T70.

The circuit can perform a right shift, a left shift, or barrel shift. Furthermore, when performing a right shift or a left bit, the fill bits can be one or zero. The following shows an example of each type of shift.

| Two position right shift with "zero" fill bits: | |
|---|---|
| Original data | 1 0 0 0 1 1 0 |
| Shifted data | 0 0 1 0 0 0 1 |

| Two Position right shift with "one" fill bits: | |
|---|---|
| Original data | 1 0 0 0 1 1 0 |
| Shifted data | 1 1 1 0 0 0 1 |
| Two position left shift with "zero" fill bits: | |
| Original data | 1 0 0 0 1 1 0 |
| Shifted data | 0 0 1 1 0 0 0 |
| Two Position left shift with "one" fill bits: | |
| Original data | 1 0 0 0 1 1 0 |
| Shifted data | 0 0 1 1 0 1 1 |
| Two Position barrel shift (left) | |
| Original data | 1 0 0 0 1 1 0 |
| Shifted data | 0 0 1 1 0 1 0 |
| Set-reset operation with fill of "one" | |
| Original data | 1 0 0 0 1 1 0 |
| Shifted data | 1 1 1 1 1 1 1 |

The particular shift operation performed depends on whether data or fill is gated to lines A0 to A7, and to lines B1 to B7 as follows:

Left Shift: Data on A0 to A7, fill on B1 to B7
Right Shift: Data on B1 to B7, fill on A0 to A7
Barrel shift (left): Data on A0 to A7, and data on B1 to B7
Set-reset: Fill on A0 to A7, fill on B1 to B7

The following table indicates what type of operation takes place in response to various signals on lines M0 and M1.

| Line M0 | Line M1 | Operation |
|---|---|---|
| 0 | 0 | Fill is passed to all bits on the output |
| 1 | 0 | Left shift with fill |
| 0 | 1 | Right shift with fill |
| 1 | 1 | Barrel shift (left) |

The amount that data is shifted as it passes through the matrix is determined by the signals on the shift control lines SC0, SC1 and SC2. Signals on these lines are in binary code. When a left shift is being performed, the three signals on the three lines represent shifts of from 0 to 7 as follows:

| Signals on lines | | | Number of bits of left shift |
|---|---|---|---|
| SC0, | SC1, | SC2 | |
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

When a right shift operation is being performed, the signals on lines SC0, SC1 and SC2, which indicate the amount of shift, must be in two's complement form. When a two's complement number on lines SC0, SC1 and SC2 is decoded into a one out of eight signal on lines S0 to S7, the amount of right shift shown below results:

The signals on lines SC0, SC1 and SC2 to produce various amounts of right shift are as follows:

| Signals on lines | | | Number of bits of |
|---|---|---|---|
| SC0 | SC1 | SC2 | Right shift |
| 1 | 1 | 1 | 1 |
| 1 | 1 | 0 | 2 |
| 1 | 0 | 1 | 3 |
| 1 | 0 | 0 | 4 |
| 0 | 1 | 1 | 5 |
| 0 | 1 | 0 | 6 |
| 0 | 0 | 1 | 7 |
| 0 | 0 | 0 | 8 |

Note that a shift of eight with fill is the same as a set-reset operation, and a barrel shift of eight is the same as a shift of zero.

Shift count decoder 12 decodes the binary signals on lines SC0, SC1 and SC2 into a one out of eight code on lines S0 to S7. The lines S0 to S7 are connected to the base of the sixty four transistors T00 to T77. The particular arrangement of connections between lines S0 to S7 is a unique aspect of the present invention. The diagonal line connecting transistors T00 to T77 is herein termed a major diagonal of the matrix. As shown in FIG. 2, the control element of all the transistors on the major diagonal are connected to control line S0. The lines A0 to A7 and B1 to B7 stop at the major diagonal. Lines A0 to A7 connect to each transistor in the associated row up to and including the transistors on the major diagonal. Lines B1 to B7 connect to all transistors in the associated rows up to the major diagonals, but lines B1 to B7 do not connect to the transistors on the major diagonal.

The particular line S0 to S7 which controls each of the transistors T00 to T77 is shown on FIG. 2; however, in order to avoid confusion in the drawing, only the lines S0 and S6 are specifically shown on the drawing. Control line S0 connects to all transistors along a single line which is the major diagnol of the matrix. Control line S6, and all other control lines, connect the transistors on what can be called wrap around diagonal line. For example, line S6 is connected to the transistors on a diagonal between transistors T20 and T75, but this same line connects to transistors on a continuation of the same diagonal connecting transistors T06 to T17. Each of the lines S1 to S7 likewise connect to the base of each transistor along a particular wrap around diagonal line.

It is important to note that each of the data lines A0 to A7 are connected to approximately half of the transistors in each associated row, and data lines B1 to B7 are connected to the other transistors in each associated row. Each row of transistors is divided between its two associated data input lines by the major diagonal of the matrix. For example, data line A6 is connected to transistors T66 and T67, while data line B6 is connected to transistors T60 to T65. The transistors along the major diagonal are connected to the associated line A0 to A7.

Of particular importance is the compact nature of the matrix 14 and the minimum amount of wiring needed. While each data bit D1 to D7 is associated with two input lines in the matrix, (for example, data bit D7 is associated with lines A7 and B7) the arrangement is such that all the transistors connected to both input lines for each data bit are located on one row of the matrix. This is shown by the following table:

| Matrix row | Transistors connected to multiplexer 10A | Transistors connected to multiplexer 10B | TOTAL connections |
|---|---|---|---|
| 0 | T00 to T07 | none | 8 |
| 1 | T11 to T17 | T10 | 8 |
| 2 | T22 to T27 | T20 to T21 | 8 |
| 3 | T33 to T37 | T30 to T32 | 8 |
| 4 | T44 to T47 | T40 to T43 | 8 |
| 5 | T55 to T57 | T50 to T54 | 8 |
| 6 | T66 to T67 | T60 to T65 | 8 |
| 7 | T77 | T70 to T76 | 8 |

The symmetry of the arrangement makes the circuit lines short. This is made possible with the unique arrangement of the present invention whereby each data input goes to two banks of multiplexers, and where each data input signal can thereby feed either part or both parts of a row.

In general, at a given performance level, the power required by an electronic circuit increases in proportion to the length of the wiring in the circuit. With the unique layout and circuit of the present invention, the shift matrix has a relatively small amount of wiring and, thus, it requires relatively little power.

The specific control line S0 to S7 which is connected to the base of each transistor is shown in the following table.

| ROW | Column | | | | | | | |
|---|---|---|---|---|---|---|---|---|
| | 7 | 6 | 5 | 4 | 3 | 2 | 1 | 0 |
| 7 | S0 | S7 | S6 | S5 | S4 | S3 | S2 | S1 |
| 6 | S1 | S0 | S7 | S6 | S5 | S4 | S3 | S2 |
| 5 | S2 | S1 | S0 | S7 | S6 | S5 | S4 | S3 |
| 4 | S3 | S2 | S1 | S0 | S7 | S6 | S5 | S4 |
| 3 | S4 | S3 | S2 | S1 | S0 | S7 | S6 | S5 |
| 2 | S5 | S4 | S3 | S2 | S1 | S0 | S7 | S6 |
| 1 | S6 | S5 | S4 | S3 | S2 | S1 | S0 | S7 |
| 0 | S7 | S6 | S5 | S4 | S3 | S2 | S1 | S0 |

As previously indicated, the invention can be applied to data words having any number of bits. It can be noted that the above table is symmetrical about the major diagonal where the S0 connections are shown. The table can be expanded by adding rows and columns while maintaining the same pattern, thus establishing the connections needed for data words having any desired number of bits.

It should be noted that the designation of rows and columns is arbitrary, and the designations could be interchanged without departing from the spirit of the invention. It should also be noted that while the matrix is herein shown as square, other skewed shapes would be possible without departing from the spirit of the invention.

While the invention has been particularly shown and described with reference to preferred embodiments thereof, it will be understood by those skilled in the art that the foregoing and other changes in form and detail may be made without departing from the spirit and scope of the invention.

I claim:

1. A matrix shifter for shifting the bits of a data word as the data passes between a set of input lines and a set of output lines, the matrix shifter comprising:
    (a) a plurality of switching transistors arranged in a matrix, said matrix having rows, columns, and diagonals, one of said diagonals being a major diagonal of said matrix, each of said transistors having two electrodes and a control element, each row being associated with a particular input data bit, each column being associated with a particular output bit, and each row of said matrix being divided into first and second parts along said major diagonal;

(b) first multiplexer means for supplying to one of said two electrodes each transistor in said first part of said matrix either the associated input data bit or a fill signal;

(c) second multiplexer means for supplying to one of said two electrodes of each transistor in said second part of said matrix either the associated input data bit or a fill signal; and (d) control means for supplying different control signals to the control element of all transistors along each of said diagonals of said matrix;

whereby data can be shifted right, left, or rotated between said input and said output depending on whether data or fill is supplied by said first and second multiplexers.

2. A matrix shifter comprising:

(a) a set of data input lines having a first number of input bit positions;

(b) a set of data output lines having a second number of output bit positions;

(c) an input line indicating a desired fill bit;

(d) switching transistors arranged in rows and columns, each of said transistors having a first electrode, a second electrode, and a control electrode, the number of rows being equal to said first number, the number of columns being equal to said second number;

(e) a plurality of column lines, each column line connecting the first electrode of each transistor in a selected one of said columns to an output line;

(f) a plurality of row lines, each row line having first and second parts, the second electrode of each transistor being connected to a selected one of said row lines;

(g) a first multiplexer for gating either said data input lines or said fill input line to said first part of said row lines;

(h) a second multiplexer for gating either said data input lines or said fill input line to said second part of said row lines; and (i) a plurality of control lines, each control line connected to the control element of transistors along a diagonal of said matrix;

whereby depending which of said multiplexers gate data nd fill to said row lines, the data on the input lines is shifted right, left, or rotated.

3. Th matrix shifter recited in claim 2 wherein said transistors are bipolar transistors.

4. The matrix shifter recited in claim 2 wherein each of said transistors has a collector as said first electrode, an emitter as said second electrode, and a base as said control electrode.

5. A data shifter comprising:

(a) a plurality of transistors arranged in a matrix, said matrix having rows, columns and diagonals, one of said diagonals being a major diagonal that divides said matrix into two parts, each of said transistors having first and second electrodes and a control electrode;

(b) a plurality of output column lines, one for each of said columns, each output column line connecting the first electrode of all the transistors in one of said columns;

(c) a plurality of row lines, each row line being divided into two parts by said major diagonal, the second electrode of each transistor being connected to a selected one of said row lines;

(d) a plurality of input lines including data lines, a fill line, and shift control lines;

(e) multiplexer means gating either said data lines or said fill lines to said first and second parts of said row lines; and (f) means for applying a control signal to the control electrode of each transistor, a selected one of said diagonals for each signal on said control lines;

whereby depending upon which parts of said row lines are connected to said data input lines by said multiplexers, data is shifted right or left between said data input lines and said column output lines.

6. The data shifter of claim 5 wherein said transistors are bipolar transistors.

7. The data shifter of claim 5 wherein each of said transistors has a collector as said first electrode, an emitter as said second electrode, and a base as said control electrode.

* * * * *